United States Patent [19]
Udaka et al.

[11] Patent Number: 5,864,420
[45] Date of Patent: Jan. 26, 1999

[54] OPTICAL UNIT AND ELECTROLYTIC SOLUTION

[75] Inventors: Toru Udaka, Kanagawa; Hideharu Miyagaki, Chiba, both of Japan

[73] Assignee: Sony Corporation, Tokyo, Japan

[21] Appl. No.: 808,485

[22] Filed: Mar. 3, 1997

[30] Foreign Application Priority Data

Mar. 8, 1996 [JP] Japan .................................. 8-080811

[51] Int. Cl.$^6$ ........................................... G02F 1/153
[52] U.S. Cl. ........................................... 359/270
[58] Field of Search ........................................... 359/270

[56] References Cited

U.S. PATENT DOCUMENTS

| | | | |
|---|---|---|---|
| 3,609,469 | 9/1971 | Feldman | 317/231 |
| 4,240,716 | 12/1980 | Camlibel et al. | 350/363 |
| 4,388,385 | 6/1983 | Sekido et al. | 429/111 |
| 4,538,158 | 8/1985 | Warszawski | 346/135.1 |

FOREIGN PATENT DOCUMENTS

| | | |
|---|---|---|
| A-0 027 755 | 4/1981 | European Pat. Off. . |
| A-0 592 328 | 4/1994 | European Pat. Off. . |

*Primary Examiner*—Georgia Epps
*Assistant Examiner*—Dawn-Marie Bey
*Attorney, Agent, or Firm*—Hill & Simpson

[57] ABSTRACT

To provide an optical unit which can be driven with low electrical power, is controllable in its transmittance in visible light, has satisfactory spectroscopic properties in a light-screening state, and exhibits a life span extended by reducing the over-voltage upon the electrodes; and to provide an electrolytic solution to be used in the optical unit. An optical unit comprising a pair of opposing electrodes 2 and 3, and an electrolytic solution 1 comprising a solvent and a silver bromide dissolved therein, the electrolytic solution further containing a metal salt such as copper bromide to be co-deposited with silver, and the electrolytic solution being disposed between the opposing electrodes such that deposition/dissolution of silver is caused by drive-controlling these electrodes.

46 Claims, 9 Drawing Sheets

OPTICAL UNIT AND ELECTROLYTIC SOLUTION

BACKGROUND OF THE INVENTION

The present invention relates to optical units, for example, units for displaying figures or characters or units for a X–Y matrix displaying or a filter capable of controlling transmittances in visible light (within a wavelength range of 400 to 700 nm), and also relates to electrolytic solutions used in such optical units.

DESCRIPTION OF THE RELATED ART

Conventionally, electrochromic materials (hereinafter referred to as EC materials) are used for displays of voltage drive type, for example, displays for watches which digitally display time.

Since electrochromic devices (hereinafter, referred to as ECDs) are of non-luminescent type and utilize reflected light or transmitted light for displaying, they have some advantages such as reduced fatigue even after viewing for long periods, and lower electrical-power demand with a relatively low driving voltage. Actually, an ECD such as that disclosed in Japanese Unexamined Patent Publication No. 59-24879 is known as liquid-type one including a viologen molecule derivative used as the EC material which is an organic molecule capable of reversibly generating a colored and a colorless state.

In response to the development of precision optical instruments, there is an increasing demand for fine and low power type devices which control the quantity of light, as substitutes for conventional variable ND filters. Under such circumstances, it is increasingly necessary to investigate whether or not ECDs as described above and related techniques can be utilized for such devices.

ECDs constituted with EC materials such as viologen molecule derivatives are, however, rarely practically used since they are insufficient in response speed and degree of light-screening in view of practical use.

Due to this, many investigations were focused on, instead of ECDs, reflection-type light-control devices which utilize deposition/dissolution of metal salts, and were conducted to develop electrochemical light-control devices which utilize deposition/dissolution of silver.

Although such electrochemical light-control devices satisfy the required response speed and degree of light-screening, the transparent electrodes which constitute the substrate readily deteriorate, and therefore, the life spans of the devices are short.

In particular, with indium tin oxide (ITO) electrodes, breakage readily occurs due to an over-voltage impressed for deposition/dissolution of silver.

SUMMARY OF THE INVENTION

Accordingly, the object of the present invention is to provide an optical unit which can be driven with a reduced over-voltage upon the electrodes therein and has an extended life span; and an electrolytic solution used in the optical unit. For achieving this object, the present invention utilizes, as an appropriate electrolytic solution, a solution having no absorptivity in visible light (within a wavelength range of 400 to 700 nm), and utilizes, as the material for an electrochemical light-control device, a complex silver salt which can equally screen visible light during a colored state of the optical unit.

The Inventors obtained a light-control device comprising an electrochemical material by incorporating with a non-aqueous and reversible system in which silver from a complex silver salt can be deposited on or dissolved from the electrode (this event is referred to as deposition/dissolution). As a result, the Inventors achieved a stable optical unit, as well as an electrolytic solution to be used therein, which can be driven with low electrical power, can control transmittance of visible light, exhibits excellent spectroscopic properties, and has a reduced possibility of electrode breakage, thus accomplishing the present invention.

Specifically, an aspect of the present invention is an optical unit comprising a pair of opposing electrodes and an electrolytic solution comprising a silver salt solution which is disposed between the opposing electrodes such that deposition/dissolution of silver is caused by drive-controlling these electrodes, wherein said electrolytic solution further contains a metal other than silver, and silver is co-deposited with the metal other than silver.

Additionally, another aspect of the present invention is an electrolytic solution comprising the above-mentioned silver salt solution and the above-mentioned metal other than silver.

Hitherto, as described above, the life spans of transparent electrodes used as substrates were short due to deterioration of the electrodes during repeated drive, even though an electrolytic solution which is substantially satisfactory for practical use could be obtained. According to the present invention, the over-voltage for dissolving a deposited silver layer can be successfully reduced by co-depositing silver with a metal other than silver, for example, copper from a copper salt. Due to this, the over-voltage for the deposition/dissolution of silver can be reduced, and the life spans of the electrodes can be practically extended since the over-voltage is an important factor relating to life span.

As mentioned above, according to the present invention, the over-voltage for dissolving a deposited silver layer can be reduced to prevent electrodes, particularly ITO transparent electrodes, from deteriorating. Actually, life spans of 10 to 40 times that of a case using a conventional electrolytic solution (a Cu-free system) have been achieved in life tests using ITO electrodes.

To successfully obtain such an effect, the amount of the above-described. metal other than silver to be contained is suitably 0.1 to 100 mmol/liter in the form of a metal salt.

Meanwhile, as to deposition of silver from a complex silver salt, cyan solutions used in plating baths are well known. The cyan solutions, however, cause some problems in relation to securing a safe working environment and disposal of waste fluids. Accordingly, the Inventors focused their interest on silver salts of non-cyan type, and conducted investigations on them.

In the investigations, various electrolytic solutions of complex silver salts were tested with the addition of reductants, and systems having excellent reversibility were obtained by incorporating with solutions selected from among the solutions tested. The materials used in these systems, which are named as RED (Reversible Electro Deposition) materials, were dissolved in solvents to prepare RED solutions.

The RED solutions (electrolytic solutions) examined up to the present were solutions prepared using silver iodide as a halogenated silver, ascorbic acid as a reductant for improving reversibility, and dimethylsulfoxide (DMSO) as a non-aqueous solvent. The solutions using silver iodide, however, have some drawbacks. For example, in some cases, such solutions will be stained and degraded due to generation of iodine during dissolution of silver. Further, image information in the light-screening state is frequently blurred due to deterioration in the spectroscopic properties of the silver layer to be deposited, namely, uneven absorptivities in visible light.

Such drawbacks may be attributed to the standard oxidation reduction potential of iodide which is lower than those of bromine and chlorine, as shown below.

$$I_2 + 2e^- \rightleftarrows 2I^- \; (0.536 \text{ V})$$

$$Br_2 + 2e^- \rightleftarrows 2Br^- \; (1.065 \text{ V})$$

$$Cl_2 + 2e^- \rightleftarrows 2Cl^- \; (1.360 \text{ V})$$

(based on hydrogen)

Accordingly, in the present invention, the inventors find out that the silver salt to be used is preferably silver bromide which has a relatively higher standard oxidation reduction potential. By using silver bromide, the above-mentioned reaction gas, which has a staining effect and is generated as a by-product during dissolution of silver, can be reduced, and a system in which the silver layer to be deposited has even absorptivities in visible light can be obtained. Accordingly, a system in which the silver layer to be deposited exhibits excellent spectroscopic properties can be achieved, and deterioration of optical information in the light-screening state due to irregularity of color can be effectively prevented.

As a matter of course, RED solutions according to the present invention have no absorptivities in visible light (within a wavelength range of 400 nm to 700 nm) at preparation, and preferably, the solutions is prepared using a complex salt of silver bromide with which an even light-screening of visible light can be achieved in the colored state. Further, a complex salt of silver bromide is readily reversibly deposited/dissolved by drive-controlling the electrodes.

As described above, a specific reversible system, in which silver from a silver salt, preferably from silver bromide is deposited and dissolved, is used in the present invention. As a result, the present invention can provide an optical unit such as a display unit or an optical filter which is of non-luminescent type, can be driven with a low power, and is suitably applicable for uses in relation to visible light.

In the optical unit of the present invention, the electrolytic solution to be used is preferably not stained due to dissolution of a metal other than silver.

As the metal other than silver, copper is preferably used, and the copper may be contained in the solution as copper halide such as copper chloride or copper bromide.

If the solution is stained due to dissolving copper halide, the transparency of the solution should preferably be maintained with a clarifier such as a complexing agent or a reductant. In other words, although organic solutions will usually have absorptivities in visible light when copper halide is dissolved in them, which is undesirable for the unit of the present invention to be used in an optical system, such absorption by organic solutions in visible light can be sufficiently prevented by complexing or reducing the dissolved copper salt with a clarifier such as triethanolamine so as to cause the following reaction as in the present invention.

$$Cu^{2+}(\text{colored}) + e^- \rightarrow Cu^+(\text{colorless})$$

In general, the above-mentioned clarifier may be a complexing agent or a reductant, and may comprise at least one compound selected from the group consisting of triethanolamine, iminodiacetic acid, trans-1,2-cyclohexanediaminetetraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl) ethylenediamine, ethylenediamine-N,N,N',N'-tetraacetic acid, salicylic acid, 2-meracaptobenzoimidazole, 1-allyl-2-thiourea, thiouracil, and dimethylthioformamide.

Among the above-listed compounds for the above-mentioned clarifier, typical examples of compounds acting as complexing agents are triethanolamine, iminodiacetic acid, trans-1,2-cyclohexanediaminetetraacetic acid, nitrilotriacetic acid, and galactitol. On the other hand, typical examples of compounds acting as reductants are ascorbic acid, dimethylamineborane, trimethylamineborane, and tetrabutylammonium borate.

In the present invention, the optical unit may comprise a pair of opposing electrodes, at least one of which should be in charge of deposition/dissolution of silver, and an electrolytic solution which comprises a solvent and a silver salt dissolved therein, and is disposed between the opposing electrodes in contact with these electrodes.

Preferably, an electrolytic solution in which silver bromide is dissolved in water or a nonaqueous solvent, particularly a nonaqueous solvent, should be disposed such that a colored state and a colorless state of the optical unit can be generated according to deposition/dissolution of silver.

In such a case, the electrolytic solution to be used is preferably a RED solution containing silver bromide at a concentration of 0.03 to 2.0 mol/liter, and more preferably, 0.05 to 2.0 mol/liter.

Further, at least one brightener, at least one complexing agent and/or at least one reductant is preferably added to the solution.

The brightener may be selected from the group consisting of thiourea, 1-allyl-2-thiourea, mercaptobenzimidazole, and coumarin.

Further, the complexing agent may be selected from the group consisting of phthalic acid, succinic acid, salicylic acid, and glycollic acid.

Moreover, the reductant may be selected from ascorbic acid, dimethylamineborane (DMAB), trimethylamineborane (TMAB), tartaric acid, oxalic acid, and D-glucono-1,5-lactone.

The system to be used in the present invention should preferably be incorporated with a RED solution having high solvency for a silver salt, and in addition, the system should preferably be prepared to have high reversibility by adding at least one reductant. Concerning RED solutions, many investigations were focused on the use of ascorbic acid as the reductant, and the use of, as the solvent, a nonaqueous single solvent which consists of dimethylsulfoxide (DMSO). Such RED solutions, however, have some problems in their characteristics at low temperature since the freezing point of DMSO itself is as high as 18° C. As a result, for example, such RED solutions readily freeze during use in cold districts. For this reason, the solvents which could be used were limited.

Under such circumstances, the Inventors selected systems from nonaqueous systems in which silver from a complex silver salt can reversibly be deposited on or dissolved from a transparent electrode, and which are incorporated with solvents having sufficiently low freezing points for use at low temperature without deterioration in characteristics, and subsequently, the Inventors examined reductants in view of applicability to such systems.

As a result, the above-listed reductants such as DMAB and TMAB could be recognized as reductants that were previously not examined but are applicable as solvents having low freezing points. The above-listed reductants such as DMAB and TMAB can sufficiently be used together with solvents each having a freezing point low enough for improving low temperature characteristics of the electrolytic solution to be obtained, and these reductants can be dissolved in such solvents more readily than ascorbic acid. By using such reductants, the freezing point of the electrolytic solution to be obtained is lowered, and therefore, the electrolytic solution will not freeze during use in cold districts. The concentration of the reductant is preferably within a range of $\frac{1}{150}$ to 1 times that of the silver salt.

Preferable examples of solvents having low freezing points may be nonaqueous solvents comprising at least one solvent compound selected from the group consisting of dimethylformamide (DMF), diethylformamide (DEF), N,N-dimethylacetaminde (DMAA), N-methylpropionic acid amide (MPA), N-methylpyrrolidone (MP), propylene carbonate (PC), acetonitrile (AN), 2-methoxyethanol (MEOH), and 2-ethoxyethanol (EEOH).

Each of these nonaqueous solvents has a freezing point lower than that of DMSO. Particularly, each of DMF, DEF, MEOH, and EEOH has a freezing point 70° C. or more lower than that of DMSO. A RED solution comprising such a solvent and a silver salt, especially silver bromide dissolved therein has excellent characteristics at low temperature, and sufficient applicability for use in cold districts.

Additionally, the RED solution may preferably further contain a supporting salt within a range of ½ to 5 times the concentration of silver bromide for the purpose of enhancing the conductivity of the solution.

Further, silver bromide in the solution is preferably converted into a complex silver salt by adding a supporting electrolyte which can be a resource of halogen such as bromine for the purpose of enhancing the conductivity of the RED solution and promoting dissolution of silver bromide. Examples of such an electrolyte are sodium bromide, potassium bromide, and quatenary-ammonium bromide.

Such a supporting electrolyte is added preferably within a range of ½ to 5 times the concentration of silver bromide.

Moreover, the deposition potential of silver onto transparent electrodes can be reduced by a chemical or physical modification to transparent electrodes (particularly, ITO electrodes which are prepared by doping indium oxide with tin) used as working electrodes where silver is deposited/dissolved. Due to this, silver can readily be deposited/dissolved, and electrical damage upon the transparent electrodes and the electrolytic solution itself can be reduced.

As such a chemical modification to ITO electrodes, a surface treatment such as chemical plating with palladium or the like is preferably performed by employing, for example, a two solution method with a tin solution and a palladium solution. This modification treatment is, namely, surface-activating treatment with palladium for ITO electrodes, and ITO electrodes having a high surface activity can be achieved by depositing nuclei of palladium on the substrates consisting solely of ITO.

In the above treatment, the tin solution may be prepared by dissolving 0.10 to 1.0 g of tin chloride ($SnCl_2$) in 1 liter of a HCl solution having a concentration of 0.010 to 0.10%, and the palladium solution may be prepared by dissolving 0.10 to 1.0 g of palladium chloride ($PdCl_2$) in 1 liter of a HCl solution having a concentration of 0.010 to 0.10%.

On the other hand, as a physical modification, a metal less oxidizable than silver may be vapor-deposited on ITO electrodes.

In the optical unit of the present invention, the electrolytic solution is required to have no absorptivities in visible light during a colorless state, and the substrate electrodes for generating a colored and a colorless states are preferably ITO electrodes having no absorptivities in visible light for proper operation of the optical unit.

As for driving the light-control device, current modulation is preferably employed since the RED solution to be used in the device cannot be stirred during the repetition of generating the colored and colorless states due to the smallness of the device. With current modulation, the electrochemical deposition and dissolution of silver can be readily quantitatively controlled.

To obtain an improved colored/colorless response (speed of silver deposition/dissolution), the driving method for generating the colored and colorless states with current modulation is preferably based on the use of a current which varies squarely from a high current value to a low current value. Alternatively, a driving method may be based on the use of a current which varies squarely from a low current value to a high current value, while aiming at decreasing the damage upon the substrate electrodes by repetition of silver deposition and dissolution. When a driving method based on the use of a constant current is employed, the voltage should preferably be controlled at the critical value for generation of by-products to maintain the balance of electrolytes in the system.

According to the present invention, the optical units to be obtained are useful as units for displaying figures or characters, as units for X–Y matrix displaying, or as optical filters capable of controlling transmittances in visible light (within a wavelength range of 400 to 700 nm).

Additionally, the present invention provides an electrolytic solution to be used for such an optical unit, the electrolytic solution comprising a solvent, and a silver salt and a metal other than silver dissolved in the solvent.

Desirably, the electrolytic solution of the present invention comprises water or a nonaqueous solvent, and a silver salt such as silver bromide dissolved in the solvent at a concentration of 0.03 to 2.0 mol/liter. The colored and colorless states are generated according to the deposition/dissolution of silver. According to the present invention, the electrolytic solution may further contain the above-described additives. As occasion demands, the electrolytic solution may further contain brighteners, complexing agents, reductants, supporting electrolytes, and other solvents in proper amounts.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

The present invention will be further illustrated with an example below.

Figure 7:
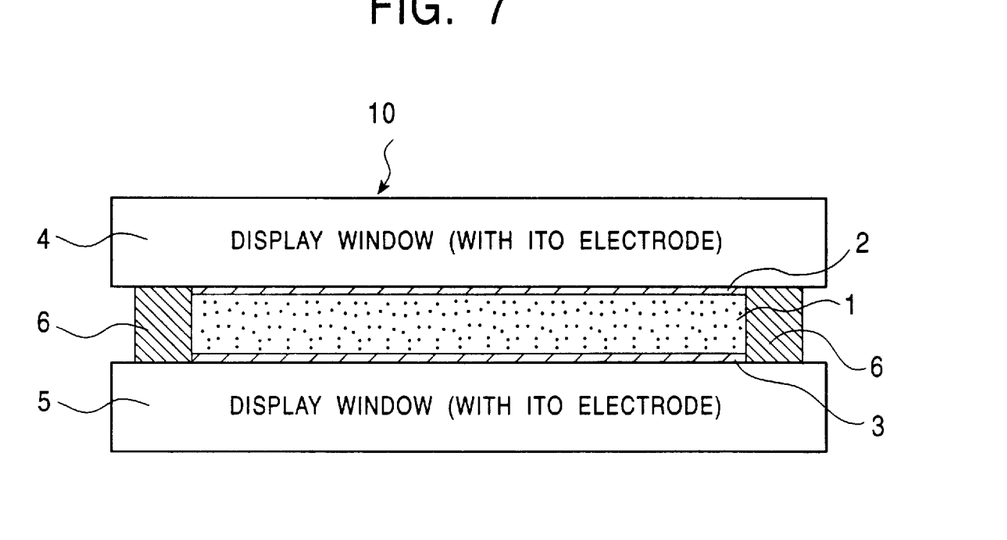
FIG. 7 is a schematic sectional view of an optical unit based on the present invention.
Figure 8:
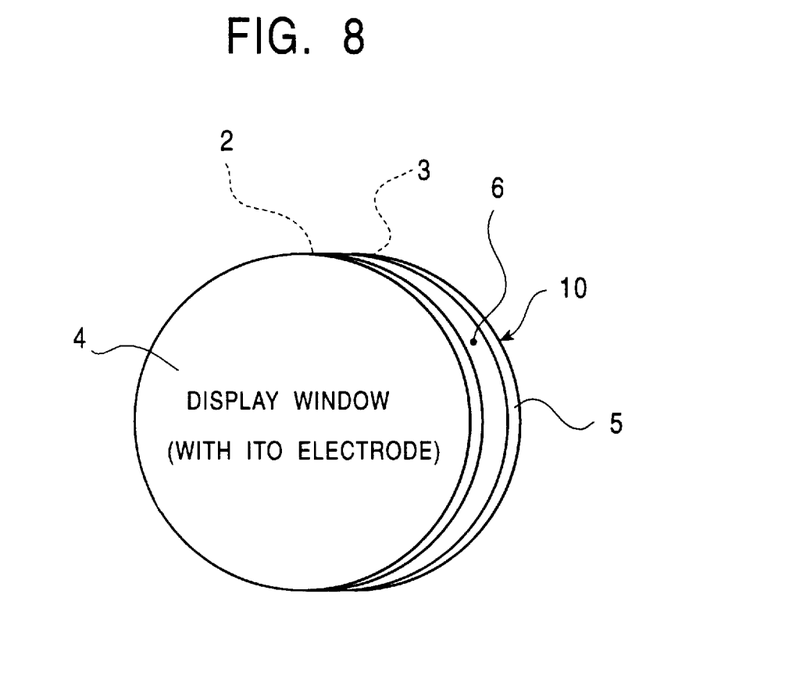
FIG. 8 is a schematic perspective view of the optical unit shown in FIG. 7.

Initially, an example optical unit 10 used as a displaying unit or an optical filter will be illustrated referring to FIGS. 7 and 8.

The optical unit 10 of this example comprises a pair of transparent substrates 4 and 5 such as glass plates which are disposed as display windows with a pre-determined space, and which constitute a cell; and working electrodes 2 and 3 such as ITO electrodes which are disposed on the internal surfaces of the substrates so as to oppositely face one another, and at least one of which is a electrode for generating a colored state or a colorless state. Though being shown only schematically in the figures, these working electrodes actually have a pattern specified depending on the purpose.

Further, a counter electrode 6 is provided so as to surround the entire periphery of the substrates 4 and 5. The counter electrode serves as a spacer as well, and comprises, for example, a silver plate. Though not being shown in the figures, a reference electrode such as a silver wire is also provided.

Moreover, a RED solution 1 is disposed between the opposing working electrodes 2 and 3 so as to be in contact with these electrodes, the RED solution comprising a nonaqueous solvent and RED materials, namely, a complex salt of silver bromide and copper bromide or the like. One of the opposing working electrodes 2 and 3 is set as an anode, and the other is set as a cathode. By impressing a driving voltage for a pre-determined time period between these electrodes to cause a direct current, an oxidation-reduction reaction according to the following reaction formula is caused in relation to the complex silver salt at the cathode.

Consequently, by the deposition of silver, the cathode turns to be colored from being transparent.

As a result of depositing silver on the electrode, a specific color such as a reflected color can be observed through the display window, namely, the obtained unit can be a filter. This filter function according to generation of the colored state, namely transmittances in visible light or tones in the colored state, varies depending on the level of the voltage or the impressing time. By controlling these parameters, the optical unit can function as a transmittance-variable display unit or filter.

Figure 9:
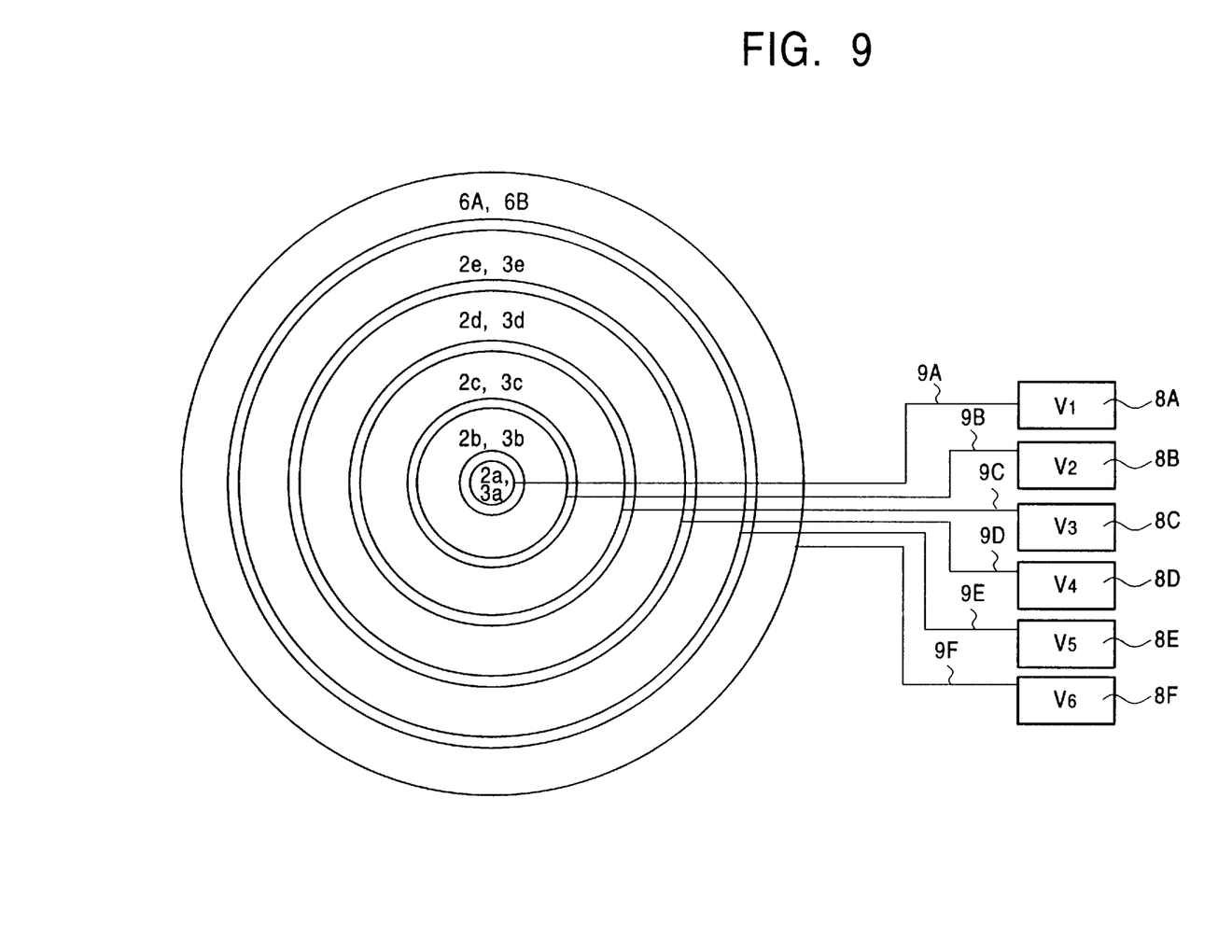
FIG. 9 is a schematic drawing showing the pattern of the ITO electrode in a example of the optical unit based on the present invention.
Figure 10:
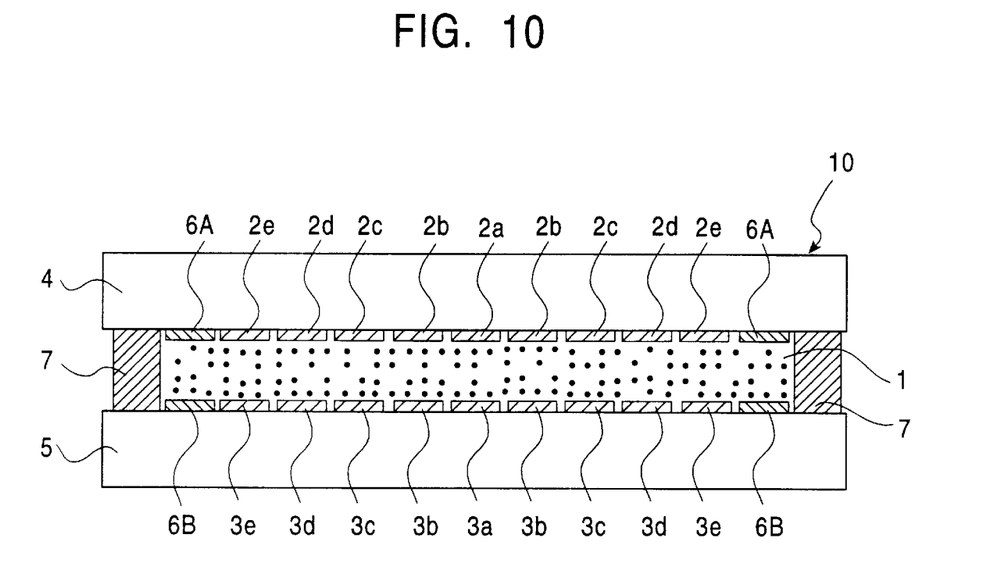
FIG. 10 is a schematic sectional view of the optical unit shown in FIG. 9.

In the optical unit 10, the opposing working electrodes 2 and 3 may be disposed so as to cover the entire internal faces of the substrates. Alternatively, the electrodes can be composed of some portions such as shown in FIGS. 9 and 10.

In detail, each of the opposing working ITO electrodes provided on the transparent substrate 4 or 5 comprise a set of electrode portions, namely, a central portion 2a or 3a and ring portions 2b to 2e or 3b to 3e that are concentrically disposed around the central portion with a gap, respectively. Around the most peripheral ring portions 2e and 3e, counter electrodes 6A and 6B are provided to compensate for the voltage.

These portions 2a and 3a, 2b and 3b, 2c and 3c, 2d and 3d, 2e and 3e, and these counter electrodes 6A and 6B are respectively connected to driving electrical sources 8A to 8F through wires 9A to 9F each comprising a chromium thin wire or the like.

Further, the transparent substrates 4 and 5 are disposed so as to have a pre-determined space between them with a spacer 7 (in FIG. 8, the counter electrode 6 also functions as the spacer). The space is filled with a RED solution 1.

In the RED solution 1, the oxidation-reduction reaction, namely the concentration, is controlled according to the level of the impressed voltage. Accordingly, the quantities of silver from the RED solution deposited on the above-described electrodes of the cathode side can be controlled by controlling voltages V1 to V5 that are impressed between the portions 2a and 3a, 2b and 3b, 2c and 3c, 2d and 3d, and 2e and 3e, respectively. Incidentally, a compensation voltage V6 is also impressed between the counter electrodes 6A and 6B.

When all the voltages are equally set, namely, V1=V2=V3=V4=V5, the homogeneous colored state can be generated throughout the electrode portions of the cathode side, and the tone of the colored state can be homogeneously changed by controlling the voltages.

On the other hand, when the voltages are set differently, for example, V1<V2<V3<V4<V5, the tone of the color generated on the electrode portions gradually becomes deeper, namely, transmittance becomes smaller, from the central portion to the peripheral portions. This is useful, for example, as an optical diaphragm used in a CCD (charge coupled device) in a television camera or the like, and can sufficiently cope with advance in CCD integration. When the voltage levels are set in reverse to the above order, the transmittance becomes larger from the central electrode to the peripheral electrodes.

Accordingly, in the optical unit provided with working electrodes each of which comprises a set of separated electrode portions, the image pattern and the degree or tone of the colored state can be controlled by controlling the voltages impressed on the sets of separated electrode portions. As a result, the optical unit can also be used for various optical filters, namely, the applicability of the optical unit can be extended.

As illustrated above, this example is based on a concept quite different from that of the prior art which is directed to conventional EC materials, and uses a RED material comprising silver bromide as a filter material for light-control in the optical unit. In the optical unit of this example, the tone of the colored state generated with the RED material can be varied by drive-controlling the opposing working electrodes, especially by controlling the impressed voltages. By utilizing this feature, the display unit or optical filter to be obtained can be tone-variable. Accordingly, by using RED materials, there can be provided a filter which is satisfactorily small, can be driven with low electrical power, and has an ability as a light-control device far exceeding those of conventional variable ND filters which are driven in a mechanical manner.

Further, the RED used comprises a nonaqueous solvent such as DMF and silver bromide as a RED material dissolved therein. Since the freezing point of the nonaqueous solvent is sufficiently low, the optical unit to be obtained can possess excellent characteristics at low temperature. This nonaqueous solvent can satisfactorily dissolve, together with silver chloride, a reductant such as DMAB to be added to the RED material.

Moreover, since the RED solution further contains copper bromide, silver and copper are co-deposited on ITO transparent electrodes. Due to such co-deposition, an excessive over-voltage is not impressed on the transparent electrodes, and therefore, they incur less damage.

Next, the characteristics of the optical unit of the present invention will be illustrated in detail with the following experimental examples. In the experimental examples, the optical units similar to those in the example shown in FIGS. 7 and 8 were used.

EXPERIMENTAL EXAMPLE 1

Evaluation of the Characteristics According to a Cyclic Voltammetry (CV) Measurement Method The purpose of this experimental example is to examine a system for reversible deposition/dissolution of silver, and to evaluate deposition/dissolution characteristics of the system. In the system, silver bromide was used.

Dimethylformamide (DMF) was used as the solvent. The concentration of silver bromide was set at 0.5 mol/liter. For the purpose of promoting dissolution of silver bromide and increasing conductivity, a quaternary ammonium salt tetra-n-butyl ammonium bromide (TBAB) was dissolved at 1.0 mol/liter. Additionally, thiourea was dissolved as a brightener at 1.0 g/liter. Further, copper bromide ($CuBr_2$) as the resource of copper to be co-deposited with silver was dissolved at 2.2 mmol/liter. Although the solution had turned violet after dissolution of $CuBr_2$, the solution could return transparent by dissolving a proper amount of triethanolamine. The transparent solution thus obtained was subjected to evaluation as an electrolytic solution.

Figure 1:
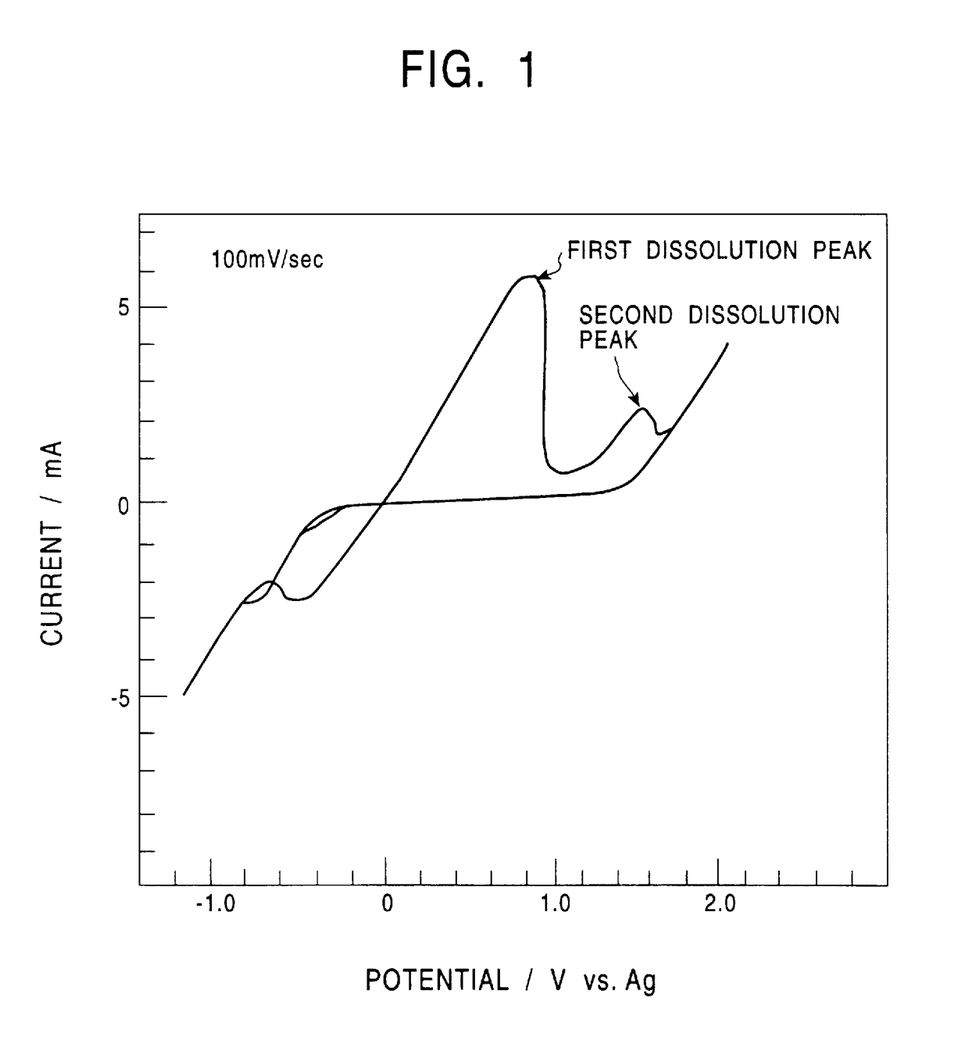
FIG. 1 a diagram showing the C-V curve of an optical unit based on the present invention.
Figure 2:
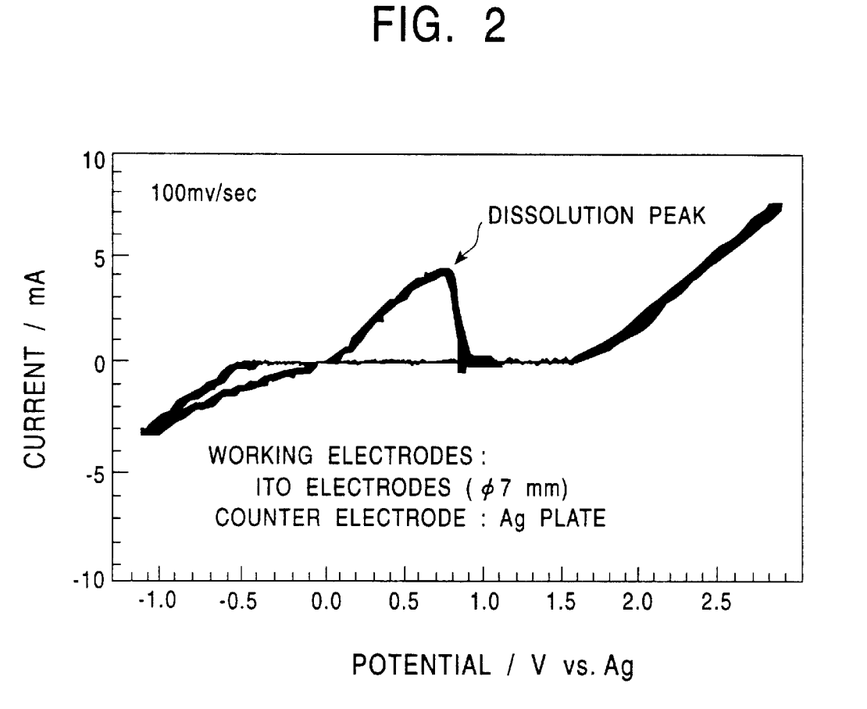
FIG. 2 is a diagram showing the C-V curve of an optical unit as a referential example.

The CV measurements were performed on an optical unit having the above-obtained electrolytic solution containing $CuBr_2$, and an optical unit having the same electrolytic solution except for not containing $CuBr_2$. In each optical unit, ITO electrodes were used as the working electrodes, a silver plate was used as the counter electrode, and a silver wire was used as the reference electrode. Measurement on each optical unit was performed with a sweep rate of 100 mV/sec. FIG. 1 shows the C-V curve of the electrolytic solution containing $CuBr_2$, and FIG. 2 shows the C-V curve of the electrolytic solution without $CuBr_2$, respectively.

According to the results of the above measurements, it was found that the residual coloring "finally completely disappeared at around +2.0 V in the optical unit having the electrolytic solution without $CuBr_2$. On the other hand, in the optical unit having the electrolytic solution containing $CuBr_2$, a second dissolution (oxidation) peak appeared in the C-V curve at around +1.6 V versus (relative to) silver. Although a voltage of about +1.5 to +2.0 V versus silver seems to be an excessive over-voltage for a system containing the copper salt, this means that the conductivity of the silver layer during dissolution can be successfully increased by co-deposition of silver and copper. Accordingly, since the second dissolution peak appeared at +2.0 V or below on the oxidation side, the over-voltage necessary for completely erasing the residual coloring" can be reduced.

As is obvious from the C-V curve shown in FIG. 1, the electrolytic solution of the example according to the present invention has a high dissolution peak on the oxidation side, and is highly reversible.

EXPERIMENTAL EXAMPLE 2

Changes in Transmittance on Deposition/ Dissolution of Silver According to a Constant Voltage Method Using the electrolytic solution containing a copper salt obtained in Experimental Example 1, deposition/dissolution of silver were performed according to a constant voltage method, and changes in transmittance on deposition/ dissolution of silver were observed.

Figure 3:
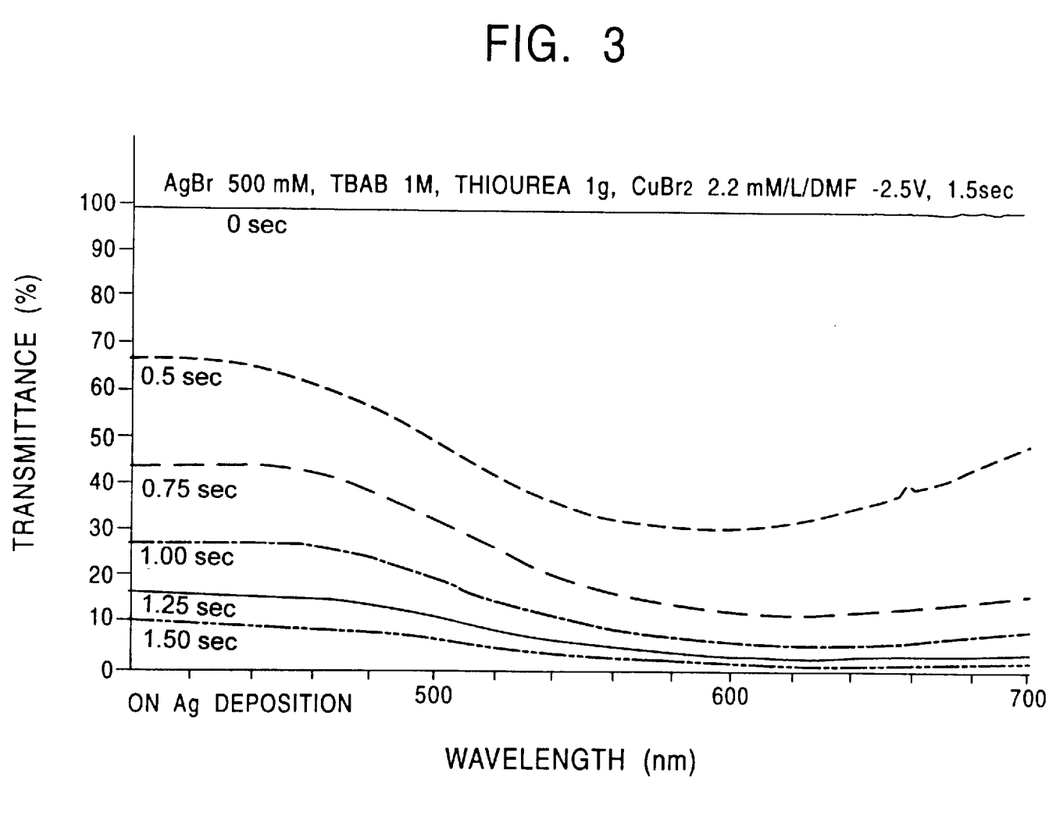
FIG. 3 is a spectrum diagram showing the change in transmittance of an optical unit based on the present invention in relation to the voltage impressed during the colored state.

The driving voltage for deposition was −2.5 V versus silver, and the driving time was 1.5 sec. On the other hand, the driving voltage for dissolution was stepwise, namely, versus silver, +4.5 V for 20 msec., +1.6 V for 2 sec., and +3.5 V for 20 msec. The changes in transmittance are shown in FIG. 3 (on deposition) and FIG. 4 (on dissolution). Incidentally, the transmittance values are based on those of an ITO electrode itself.

Figure 4:
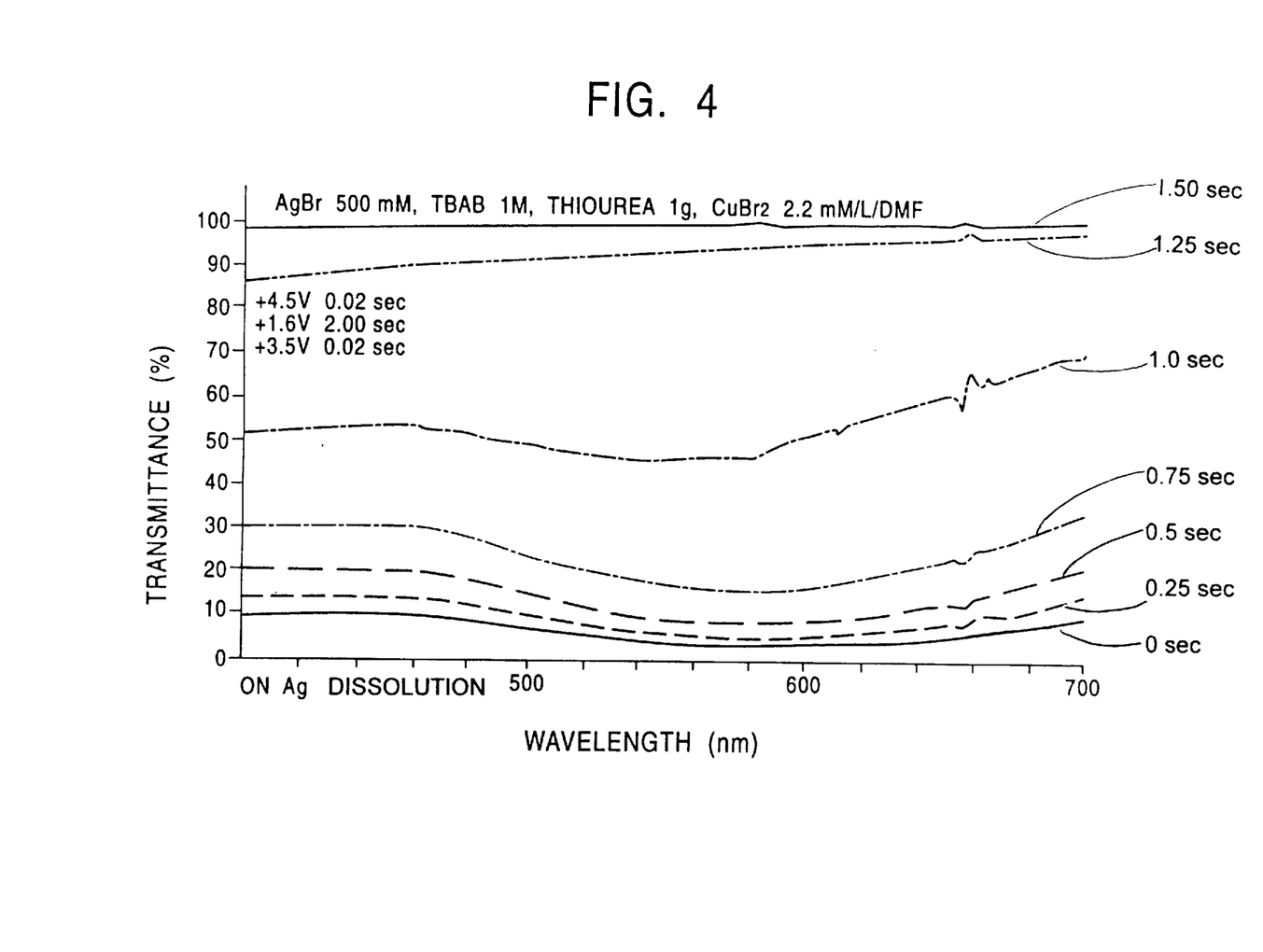
FIG. 4 is a spectrum diagram showing the change in transmittance of an optical unit based on the present invention in relation to the voltage impressed during the colorless state.

As is obvious from the results, the case using the electrolytic solution based on the present invention is capable of light-control (transmittance-varying). Further, concerning the spectroscopic properties of the deposited silver layer, the absorptivities in visible light are homogeneous, and the transmittance changes similarly in both deposition and dissolution, and a light-screening ability in visible light is exhibited.

Figure 5:
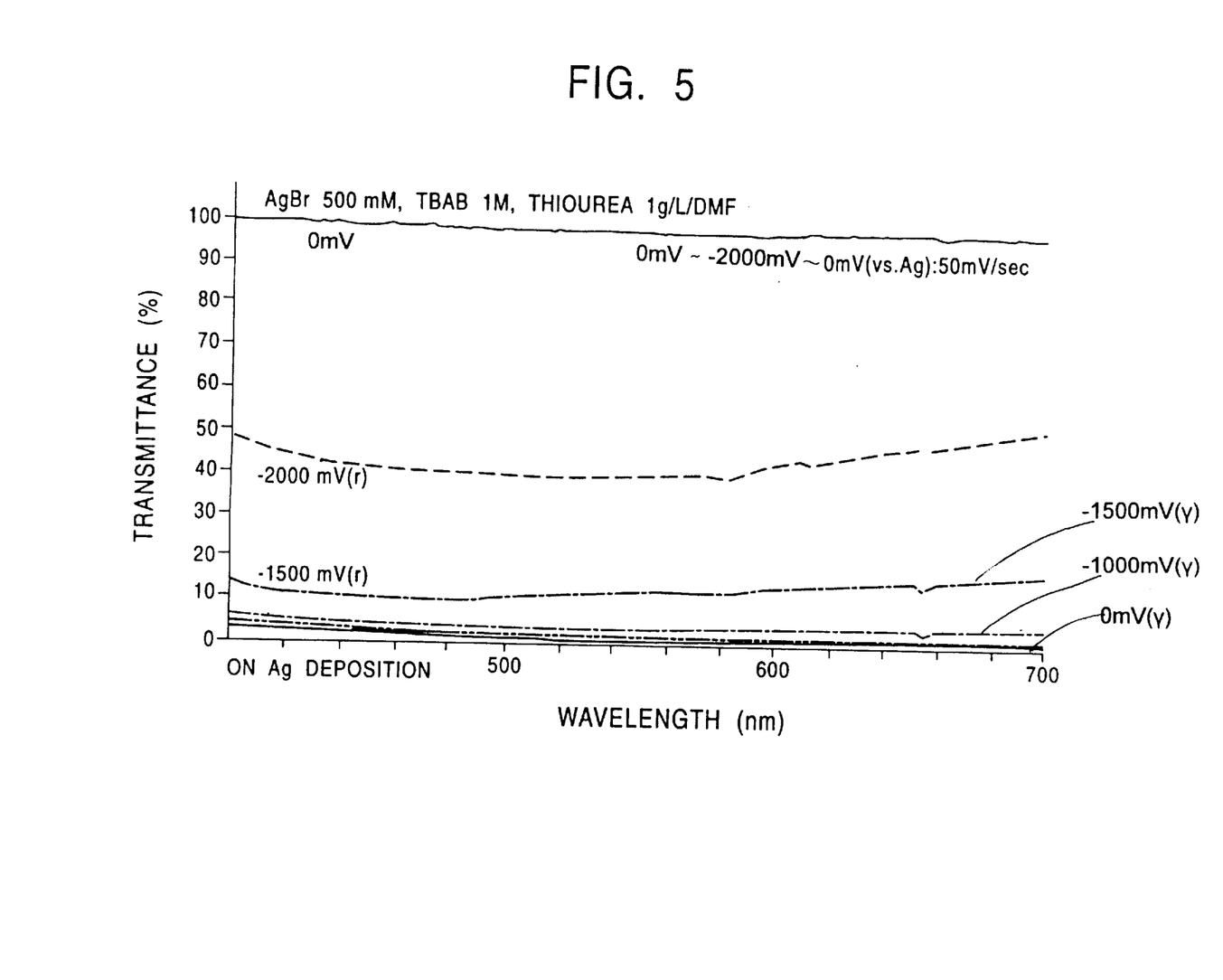
FIG. 5 is a spectrum diagram showing the change in transmittance of an optical unit as a referential example in relation to the voltage impressed during the colored state.
Figure 6:
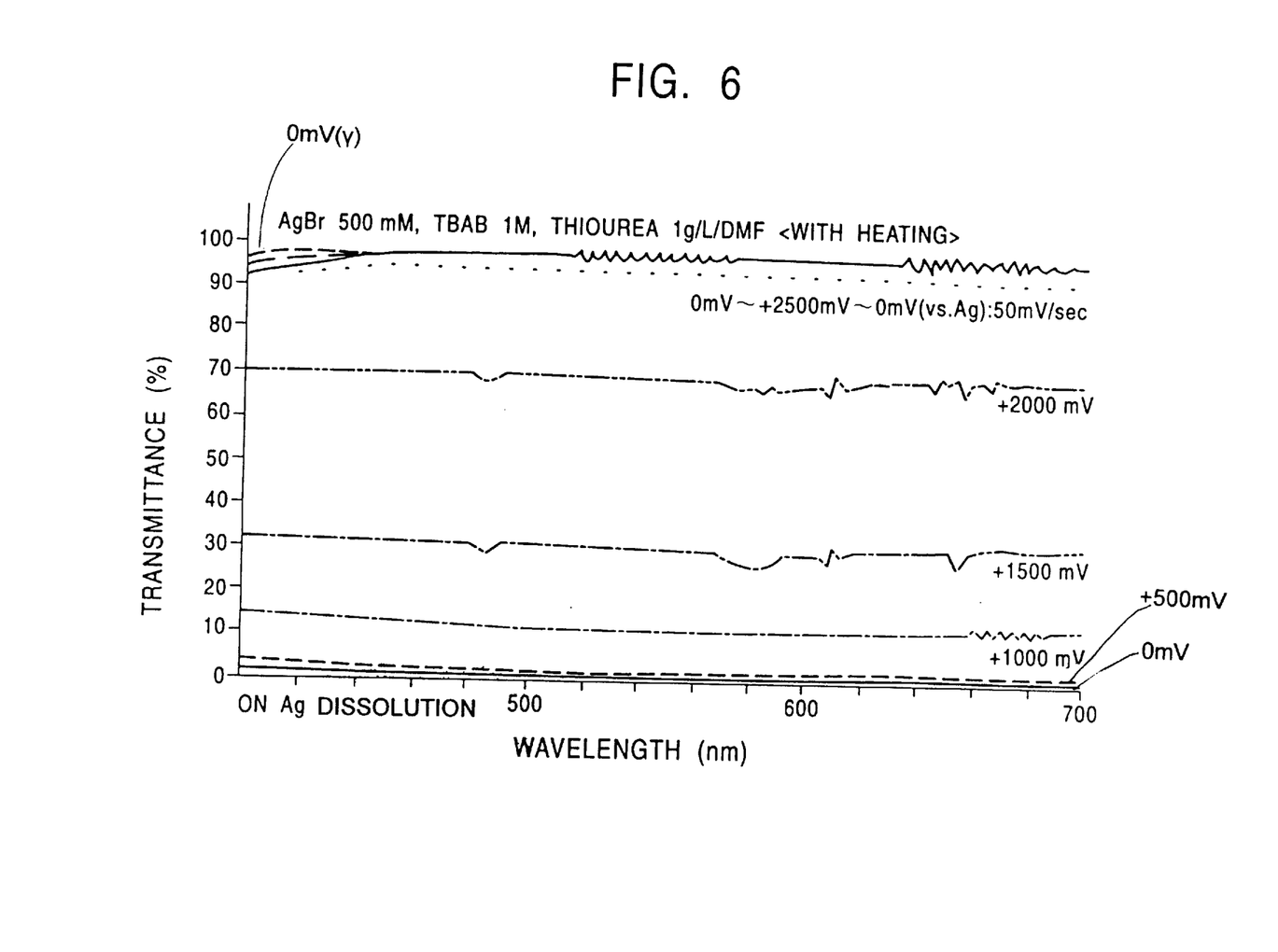
FIG. 6 is a spectrum diagram showing the change in transmittance of an optical unit as a referential example in relation to the voltage impressed during the colorless state.

Additionally, a unit using an electrolytic solution having the same composition as the above except that $CuBr_2$ was not contained was also examined in this experimental example. In this case, the unit was driven with a low sweep rate. The results on transmittance changes are shown in FIGS. 5 and 6. In FIG. 5, the driving voltage was changed from 0 mV to −2000 mV by 50 mV/sec., then reversed from −2000 mV to 0 mV by 50 mV/sec. In FIG. 6, the driving voltage was changed fro 0 mV to 2500 mV by 50 mV/sec., then reversed from 2500 mV to 0 mV by 50 mV/sec. In FIGS. 5 and 6 (γ) means the voltage in reverse cycle. As is obvious from the results, even in the case without $CuBr_2$, the transmittance can be varied in the visible light region.

Nevertheless, life tests revealed that the ITO electrodes in the case using the above-described electrolytic solution containing $CuBr_2$ had life spans 10 to 40 times those of the ITO electrodes in the case using the conventional electrolytic solution without $CuBr_2$. Consequently, reducing the over-voltage on the oxidation side by adding $CuBr_2$ has been found to be important in extending the life span of the optical unit.

EXPERIMENTAL EXAMPLE 3

Low Temperature Preservation Test on Nonaqueous Solvents

The freezing points of various nonaqueous solvents are shown in Table 1 below.

TABLE 1

Freezing Points of Various Solvents (Pure Solvent)

| Solvent | Freezing Point (°C.) |
|---|---|
| DMF | −60.4 |
| DEF | −78.0 |
| DMAA | −20.0 |
| MPA | −30.9 |
| N-MP | −24.4 |
| MEOH | −85.1 |
| EEOH | −60.4 |
| PC | −49.0 |
| AN | −45.7 |
| DMSO | 18.0 |

Using above-listed solvents, low temperature preservation tests were performed. The results are shown in Table 2 below.

TABLE 2

Results of Low Temperature Preservation Tests (at −40° C. for 24 hours) AGBr: 500 MM, TBAB: 1000 mM, SC(NH$_2$)$_2$: 1 g, and CuBr$_2$: 2.2 mM

| Solvent | State |
|---|---|
| DMF | Liquid |
| DEF | Liquid |
| DMAA | Partially Frozen |
| MPA | Liquid |
| N-MP | Partially Frozen |
| MEOH | Liquid |
| EEOH | Liquid |
| PC | Liquid |
| AN | Liquid |
| DMSO | Frozen |

As is obvious from the above results, the above-listed nonaqueous solvents except for DMSO are useful since they substantially maintain liquid states without frozen throughout the preservation at −40° C. On the other hand, DMSO is completely frozen to be useless by the preservation.

EXPERIMENTAL EXAMPLE 4

Clarification Test

Using an optical unit constructed in a manner such as the example optical unit shown in FIGS. 7 and 8, a clarification test was carried out in order to examine the efficacy of clarifiers for an electrolytic solution.

Dimethylsulfoxide (DMSO) was used as a solvent. The concentration of silver bromide was set at 500 mmol/liter. Further, a quaternary ammonium salt, herein tetra-n-butylammonium bromide (TBAB), was dissolved so as to be 750 mmol/liter for the purpose of promoting dissolution of silver bromide and increasing conductivity. Moreover, as a source of metal to be co-deposited with silver, copper bromide (CuBr$_2$) was dissolved so as to be 0.1 mmol/liter. The results of this clarification test are shown in Table 3.

Incidentally, a HP8452A manufactured by Yokogawa-Hewlett-Packard, Ltd. was used as an apparatus for measuring transparency, and samples which exhibited transmittances at 400 nm of 80% or more were evaluated as "Satisfactory". In Table 3, grades in the column "Result 1" show measurement results just after the addition of each clarifier, and grades in the column "Result 2" show measurement results after being left standing at 80° C. for 24 hours. To leave standing at 80° C. for 24 hours is a sever condition than to leave standing in an ordinary state for 2,400 hours, for example, in the case where ascorbic acid is used as the clarifier.

TABLE 3

Results of Clarification Test in Relation to Cu to be Co-deposited
AgBr: 500 mM
TBAB: 750 mM
CuBr2: 0.1 mM

| Clarifier | Result 1 | Result 2 |
|---|---|---|
| Triethanolamine | Satisfactory | Satisfactory |
| Iminodiacetic Acid | Satisfactory | Satisfactory |
| Nitrilotriacetic Acid | Satisfactory | Pale Yellow |
| Trans-1,2-cyclohexane-diaminetetraacetic Acid | Satisfactory | Yellow |
| N,N,N',N'-Tetrakis(2-hydroxypropyl)ethylene-diamine | Satisfactory | Yellowish Brown |
| Ethylenediamine-N,N,N',N'-tetraacetic Acid | Satisfactory | Yellow |
| Salicylic Acid | Satisfactory | Satisfactory |
| 1-Allyl-2-thiourea | Satisfactory | Yellow |
| Dimethylamineborane | Satisfactory | Black Cottony Precipitation |
| Ascorbic Acid | Satisfactory | Yellow |
| Dimethylthioformamide | Satisfactory | Re-crystallized Precipitation |

As is obvious from Table 3, each sample exhibited excellent transparency in "Result 1". As to "Result 2", although some samples were colored to some degree, such color appearances do not matter greatly in view of practical use. Incidentally, in Table 3, "Black Cottony Precipitation" means generation of a precipitate similar to black cotton, and "Re-crystalloid Precipitation" means generation of a precipitate which seems to be recrystallized dimethylthioformaide.

In the above, an example of the present invention was illustrated. Needless to say, the above-described example can be further modified according to the spirit of the present invention.

For example, the types of the above-described RED materials, the ingredients of the RED solution, and the metal to be co-deposited with silver and the concentration thereof may be varied as occasion demands.

Further, the material of each structural part as well as structures such as the pattern of the ITO electrode, and the driving method are also not limited to those described above. For example, the pattern of the working electrodes, which is concentric in the example shown in FIG. 9, may be arranged in the form of various stripes, grids, or the like. Moreover, a set of cells having different RED solutions may be separately disposed so as to be in charge of a set of separated electrode portions, respectively. In this case, RED solutions may be used in combination with conventional EC solutions.

Furthermore, the optical units according to the present invention can be combined with other publicly-known filter members such as organic-type electrochromic members, liquid crystals, and electroluminescent members. Moreover, the optical units according to the present invention are broadly applicable, for example, to various optical systems such as optical diaphragms in CCDs, and light-control units in electro-photographic copying machines or optical communication instruments.

As described above, the present invention is based on a concept quite different from those of the prior art which are directed to conventional EC materials, and the optical units of the present invention have a specific reversible system.

The specific reversible system comprises a silver-containing RED solution which further contains a metal other than silver to be co-deposited with silver. In the system, silver is reversibly deposited on or dissolved from an opposing electrode by drive-controlling the electrodes, especially by controlling the impressed voltage upon the electrodes. Accordingly, based on the present invention, there can be provided, by using a RED material, a non-luminescent optical unit suitable for use in relation to visible light and drivable with low electrical power, and in addition, the life span of the optical unit can be extended since the over-voltage upon the electrodes can be reduced.

Although modifications and changes may be suggested by those skilled in the art, it is the intention of the inventors to embody within the patent warranted hereon all changes and modifications as reasonably and properly come within the scope of their contribution to the art.

We claim:

1. An optical unit comprising:
    a pair of opposing electrodes; and
    an electrolytic solution comprising (1) a silver salt solution disposed between said opposing electrodes such that deposition or dissolution of silver is caused by drive-controlling said electrodes, (2) a metal other than silver, and (3) at least one clarifier in order to maintain transparency of said electrolytic solution;
    wherein silver is co-deposited with said metal other than silver on at least one of said opposing electrodes.

2. The optical unit according to claim 1, wherein said electrolytic solution is not stained due to dissolution of said metal other than silver in said electrolytic solution.

3. The optical unit according to claim 1, wherein said metal other than silver is copper.

4. The optical unit according to claim 3, wherein said copper is contained in said electrolytic solution as copper halide.

5. The optical unit according to claim 1, wherein the content of said metal other than silver is 0.1 to 100 mmol/liter in the form of a metal salt.

6. The optical unit according to claim 1, wherein said silver salt is a silver halide.

7. The optical unit according to claim 1, wherein said silver salt is a silver bromide.

8. The optical unit according to claim 7, wherein a concentration of said silver bromide is 0.03 to 2.0 mol/liter.

9. The optical unit according to claim 1, wherein said opposing electrodes are transparent working electrodes comprising indium-tin oxide for deposition or dissolution of silver.

10. The optical unit according to claim 9, wherein said transparent working electrodes are chemically or physically modified.

11. The optical unit according to claim 1, wherein said clarifier is selected from the group consisting of triethanolamine, iminodiacetic acid, trans-1,2-cyclohexanediaminetetraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl)ethylenediamine, ethylenediamine-N,N,N',N'-tetraacetic acid, salicylic acid, 2-meracaptobenzoimidazole, 1-allyl-2-thiourea, thiouracil, and dimethylthioformamide.

12. An optical unit comprising:
    a pair of opposing electrodes; and
    an electrolytic solution comprising (1) a silver salt solution disposed between said opposing electrodes such that deposition or dissolution of silver is caused by drive-controlling said electrodes, and (2) copper halide.
    wherein, silver is co-deposited with said metal other than silver on at least one of said opposing electrodes, and
    at least one clarifier in order to maintain transparency of said electrolytic solution.

13. The optical unit according to claim 12, wherein said clarifier is selected from the group consisting of triethanolamine, iminodiacetic acid, trans-1,2-cyclohexanediaminetetraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl)ethylenediamine, ethylenediamine-N,N,N',N'-tetraacetic acid, salicylic acid, 2-meracaptobenzoimidazole, 1-allyl-2-thiourea, thiouracil, and dimethylthioformamide.

14. An optical unit comprising:
    a pair of opposing electrodes: and
    an electrolytic solution comprising (1) a silver salt solution disposed between said opposing electrodes such that deposition or dissolution of silver is caused by drive-controlling said electrodes, (2) a metal other than silver, and (3) at least one clarifier in order to maintain transparency of said electrolytic solution,
    wherein silver is co-deposited with said metal other than silver on at least one of said opposing electrodes, and
    wherein said electrolytic solution further contains at least one material selected from the group consisting of brightener, complexing agent, and reductant.

15. The optical unit according to claim 14, wherein said brightener is selected from the group consisting of thiourea, allylthiourea, mercaptobenzimidazole, and coumarin.

16. The optical unit according to claim 14, wherein said complexing agent is selected from the group consisting of phthalic acid, succinic acid, salicylic acid, and glycollic acid.

17. The optical unit according to claim 14, wherein said reductant is selected from the group consisting of ascorbic acid, dimethylamineborane, trimethylamineborane, tartaric acid, oxalic acid, and gluconolactone.

18. An optical unit comprising:
    a pair of opposing electrodes: and
    an electrolytic solution comprising (1) a silver salt solution disposed between said opposing electrodes such that deposition or dissolution of silver is caused by drive-controlling said electrodes, (2) a metal other than silver, and (3) at least one clarifier in order to maintain transparency of said electrolytic solution;
    wherein silver is co-deposited with said metal other than silver on at least one of said opposing electrodes, and
    wherein said electrolytic solution comprises a nonaqueous solvent and silver halide dissolved therein, and a colored or colorless state of said unit is caused by deposition or dissolution of silver.

19. The optical unit according to claim 18, wherein said nonaqueous solvent comprises at least one solvent compound selected from the group consisting of dimethylformamide, diethylformamide, N,N-dimethylacetaminde, N-methylpropionic acid amide, N-methylpyrrolidone, propylene carbonate, acetonitrile, 2-ethoxyethanol, and 2-methoxyethanol.

20. The optical unit according to claim 18, wherein said electrolytic solution further contains a supporting salt which is a source of a halogen, and which converts said silver halide into a complex salt.

21. The optical unit according to claim 20, wherein the content of said supporting salt is within a range of ½ to 5 times the concentration of silver halide.

22. An electrolytic solution comprising a silver salt solution disposed between a pair of opposing electrodes such that deposition or dissolution of silver is caused by drive-controlling said opposing electrodes, wherein said electrolytic solution further contains a metal other than silver, and silver is co-deposited with said metal other than silver, wherein said electrolytic solution further contains at least one clarifier in order to maintain transparency of said electrolytic solution.

23. The electrolytic solution according to claim 22, wherein said electrolytic solution is not stained due to dissolution of said metal other than silver.

24. The electrolytic solution according to claim 22, wherein said metal other than silver is copper.

25. The electrolytic solution according to claim 24, wherein said copper is contained as copper halide.

26. The electrolytic solution according to claim 22, wherein the content of said metal other than silver is 0.1 to 100 mmol/liter in the form of a metal salt.

27. The electrolytic solution according to claim 22, wherein said silver salt is a silver halide.

28. The electrolytic solution according to claim 22, wherein said silver salt is a silver bromide.

29. The electrolytic solution according to claim 28, wherein a concentration of said silver bromide is 0.03 to 2.0 mol/liter.

30. The electrolytic solution according to claim 22, wherein said electrolytic solution comprises a nonaqueous solvent and silver halide dissolved therein, and a colored or colorless state of said unit is caused by deposition or dissolution of silver.

31. The electrolytic solution according to claim 30, wherein said nonaqueous solvent comprises at least one solvent compound selected from the group consisting of dimethylformamide, diethylformamide, N,N-dimethylacetaminde, N-methylpropionic acid amide, N-methylpyrrolidone, propylene carbonate, acetonitrile, 2-ethoxyethanol, and 2-methoxyethanol.

32. The electrolytic solution according to claim 30, wherein said electrolytic solution further contains a supporting salt which is a source of a halogen, and which converts said silver halide into a complex salt.

33. The electrolytic solution according to claim 32, wherein the content of said supporting salt is within a range of ½ to 5 times the concentration of silver bromide.

34. The electrolytic solution according to claim 22, wherein said opposing electrodes are transparent working electrodes comprising indium-tin oxide for deposition or dissolution of silver.

35. The electrolytic solution according to claim 34, wherein said transparent working electrodes are chemically or physically modified.

36. An electrolytic solution comprising a silver salt solution disposed between a pair of opposing electrodes such that deposition or dissolution of silver is caused by drive-controlling said opposing electrodes, wherein said electrolytic solution further contains copper halide, and silver is co-deposited with said metal other than silver, and wherein said electrolytic solution further contains at least one clarifier in order to maintain transparency of said electrolytic solution.

37. The electrolytic solution according to claim 36, wherein said clarifier is selected from the group consisting of triethanolamine, iminodiacetic acid, trans-1,2-cyclohexanediaminetetraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl)ethylenediamine, ethylenediamine-N,N,N',N'-tetraacetic acid, salicylic acid, 2-meracaptobenzoimidazole, 1-allyl-2-thiourea, thiouracil, and dimethylthioformamide.

38. An electrolytic solution comprising a silver salt solution disposed between a pair of opposing electrodes such that deposition or dissolution of silver is caused by drive-controlling said opposing electrodes, wherein said electrolytic solution further contains a metal other than silver, and silver is co-deposited with said metal other than silver, wherein said electrolytic solution further contains at least one material selected from the group consisting of brightener, complexing agent, and reductant.

39. The optical unit according to claim 38, wherein said brightener is selected from the group consisting of thiourea, allylthiourea, mercaptobenzimidazole, and coumarin.

40. The electrolytic solution according to claim 38, wherein said complexing agent is selected from the group consisting of phthalic acid, succinic acid, salicylic acid, and glycollic acid.

41. The electrolytic solution according to claim 38, wherein said reductant is selected from the group consisting of ascorbic acid, dimethylamineborane, trimethylamineborane, tartaric acid, oxalic acid, and gluconolactone.

42. An optical unit comprising:
  a pair of opposing electrodes comprising a transparent electrode; and
  an electrolytic solution comprising a silver bromide, a copper bromide and clarifier dissolved therein;
  wherein said electrolytic solution is disposed between said opposing electrodes such that deposition or dissolution of silver is caused by drive-controlling said electrodes, and silver is co-deposited with copper on at least one of said opposing electrodes.

43. An optical unit comprising:
  a pair of opposing electrodes comprising an indium-tin oxide electrode; and
  an electrolytic solution comprising a silver bromide, a copper bromide and clarifier dissolved therein;
  wherein said electrolytic solution is disposed between said opposing electrodes such that deposition or dissolution of silver is caused by drive-controlling said electrodes,
  silver is co-deposited with copper on at least one of said opposing electrodes,
  the content of said silver bromide is 0.03 to 2.0 mol/liter and the content of said copper bromide is 0.1 to 100 mmol/liter,
  said clarifier is selected from the group consisting of triethanolamine, iminodiacetic acid, trans-1,2-cyclohexanediaminetetraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl)ethylenediamine, ethylenediamine-N,N,N',N'-tetraacetic acid, salicylic acid, 2-meracaptobenzoimidazole, 1-allyl-2-thiourea, thiouracil, and dimethylthioformamide.

44. An optical unit comprising:
  a pair of opposing electrodes comprising a transparent electrode; and an electrolytic solution comprising a silver salt, a copper bromide and clarifier dissolved therein, wherein said electrolytic solution is disposed between said opposing electrodes such that deposition or dissolution of silver is caused by drive-controlling said electrodes, and silver is co-deposited with copper on at least one of said opposing electrodes.

45. An optical unit comprising:

a pair of opposing electrodes comprising an indium-tin oxide electrode; and an electrolytic solution comprising a silver bromide, a copper salt and clarifier dissolved therein, wherein said electrolytic solution is disposed between said opposing electrodes such that deposition or dissolution of silver is caused by drive-controlling said electrodes, silver is co-deposited with copper on at least one of said opposing electrodes, the content of said silver bromide is 0.03 to 2.0 mol/liter, the content of said copper salt is 0.1 to 100 mmol/liter, and said clarifier is selected from the group consisting of triethanolamine, iminodiacetic acid, trans-1,2-cyclohexanediamineteraacetic acid, nitrilotriacetic acid, galactitol, ascorbic acid, dimethylamineborane, trimethylamineborane, tetrabutylammonium borate, triethanolamine borate, N,N,N',N'-tetrakis(2-hydroxypropyl)ethylenediamine, ethylenediamine-N,N,N',N'-tetraacetic acid, salicylic acid, 2-meracaptobenzoimidazole, 1-allyl-2-thiourea, thiouracil, and dimethylthioformanide.

46. An electrochromic device capable of controlling transmittance of visible light comprising:

a pair of opposing electrodes, one of which is a transparent electrode; and an electrolytic solution comprising (1) a silver salt solution disposed between said opposing electrodes such that deposition or dissolution of silver is caused by drive-controlling said electrodes, (2) a metal other than silver, and (3) at least one clarifier in order to maintain transparency of said electrolytic solution;

wherein silver is co-deposited with said metal other than silver on at least one of said opposing electrodes.

* * * * *